L. W. ROSENTHAL.
CALCULATING MACHINE.
APPLICATION FILED MAY 4, 1915.

1,260,062.

Patented Mar. 19, 1918.
8 SHEETS—SHEET 1.

Fig.1.

Witnesses:
L. Hauenstein
E. Nathan

Inventor
Leon W. Rosenthal
By Attorneys

L. W. ROSENTHAL.
CALCULATING MACHINE.
APPLICATION FILED MAY 4, 1915.

1,260,062.

Patented Mar. 19, 1918.
8 SHEETS—SHEET 6.

Witnesses:
L. Hauerstein
E. Nathan

Inventor
Leon W. Rosenthal
By Attorneys
Pennie Davis & Marvin

UNITED STATES PATENT OFFICE.

LEON W. ROSENTHAL, OF NEW YORK, N. Y.

CALCULATING-MACHINE.

1,260,062.  Specification of Letters Patent.  Patented Mar. 19, 1918.

Application filed May 4, 1915. Serial No. 25,739.

*To all whom it may concern:*

Be it known that I, LEON W. ROSENTHAL, a citizen of the United States, whose post-office address is 240 W. 137 street, city, county, and State of New York, have invented certain new and useful Improvements in Calculating-Machines; and I do hereby declare the following to be a full, clear, and exact description of the invention, such as will enable others skilled in the art to which it appertains to make and use the same.

The present invention relates to calculating machines primarily adapted for multiplication and division, wherein the multiplying mechanism is in constant connective relation with different series of denominations of the adding mechanism, so that the partial results are registered on the adding mechanism in proper denominational relation without mounting either the multiplying mechanism or the adding mechanism on a traveling carriage to effect identation. The copending application of Marcus C. Hopkins and myself, Serial No. 7237, filed February 10, 1915, discloses a machine of this general type but provides key-set motor-operated mechanism while this machine has a single setting lever for each digit of each factor and is operated directly by hand in setting up the multiplier factor. Furthermore, instead of having a separate series of connecting gears for each multiplier digit, the transmitting connections of this machine have for all the multiplier digits a single series of gears which may be connected to any one of the several series of denominations of the adding mechanism to connect the multiplying mechanism to the adding mechanism in accordance with the denomination of the multiplier digit. The present machine also embodies certain other improvements applicable likewise to other types of calculating machines, as will be understood from the following description and claims taken in connection with the accompanying drawings, in which—

The machine shown herein has a single multiplying member and the six gears driven thereby are set up in accordance with the multiplicand digits by six setting levers. The rotatable multiplying member $A'$ is a double face disk having concentric circles of axially projecting pins $A^2$ of tooth section on both faces (Figs. 1, 2, 3, and 4). The pins are arranged on each face in nine sectors, contiguous to each other along the radial lines $A^3$ of pins. The radial separation of adjacent circles gradually decreases from the inner to the outer circles so that the nine lines $A^3$ are exactly radial with the pins on equal spacing throughout the circles. The lines $A^3$ of pins on one face are parallel to corresponding lines on the other face, the pins being oppositely disposed and fastened to the disk. The innermost circle contains 9 pins, or 1 per sector, and the number increases 9 per circle toward the outermost circle which contains 81 pins, or 9 per sector. The shaft $A^4$ is fast with the disk, and is supported in bearings in the plates $A^5$ carried by the base plate $A^6$ of the machine.

There are three twelve-tooth gears $A^7$ on each side of the disk slidably mounted on the slotted shafts $A^8$ and rotatively connected thereto by pins extending into the slots to thereby turn the shafts at any set position. The shafts on each side are set 120° apart, those on one side being advanced 40° relatively to those on the other side so that the radial lines $A^3$ of the pins engage all the gears simultaneously. The shafts $A^8$ extend into the bearing members $A^9$, which are loosely mounted on the shaft $A^4$, and also extend radially across the circular series of pins $A^2$ through the outer bearing members $A^{10}$. The bevel gears $A^{11}$ are fastened on the outer ends of the shafts $A^8$ and engage bevel gears $A^{12}$ in such manner that all the shafts $E'$ rotate in the same direction while the shafts $A^8$ on the two sides of the multiplying disk $A'$ rotate in opposite directions.

Each gear $A^7$ is provided for a single denomination of the multiplicand factor and it may be moved along any radial line $A^3$ to any circular series of pins $A^2$ to set up any digit 1 to 9, or it may be moved to a point outside the periphery of the multiplying disk in engagement with the stationary lock $A^{13}$ when the multiplicand digit is 0. The gear face is wide enough to engage one circle of pins while disengaging another, and the face of the teeth is beveled off at the inner end to permit the pins, when rotating, to enter more easily between the teeth, especially when the gear is set near the center of the disk. (See Fig. 3). Furthermore, the gears are cupped at $A^{14}$ so as to embrace the projecting part of the bearing member $A^9$ and thereby be movable to the innermost circle of pins. The outside diameter of each gear $A^7$ is such that there is no interference when all the gears are set to the innermost circle of pins. The locks $A^{13}$ are so positioned that each gear engages a lock before disengaging the pins in the outermost circle, and vice versa.

There is an individual setting lever $B'$ for each gear $A^7$ for moving it into engagement with any circular series of pins $A^2$, and the multiplicand digit so set up appears on the indicator $B^2$ through the sight opening $B^3$. (Figs. 1, 2, 3, 4 and 6). Each lever $B'$ is journaled on a stud $B^4$ for movement of the lever about the axis of rotation of the multiplying disk $A'$, and it carries an internally toothed segment $B^5$ meshed with a wide gear $B^6$. All of the gears $B^6$ are loose on the shaft $A^4$ and each one is also meshed with a straight rack $B^7$ which slides in a guide $B^8$ and carries a fork $B^9$ embracing a groove in the collar of its gear $A^7$. Each rack $B^7$ is parallel with the shaft $A^8$ that carries the gear it sets up, and the arrangement is such that upon depression of a setting lever $B'$, for instance to the dotted position shown in Fig. 6, the corresponding gear is moved toward the center of the multiplying disk without interference with any of the parts. The gears $A^7$ are moved positively in both directions, that is from a circular series of pins $A^2$ representing one digit to another circular series representing either a greater or a lesser digit, or into engagement with the locks $A^{13}$. In this way, any multiplicand factor of six or less digits is set up and the setting indicated by the indicators $B^2$, the digits being set up in any order and the factor remaining set up until changed by the operator.

Figure 1:
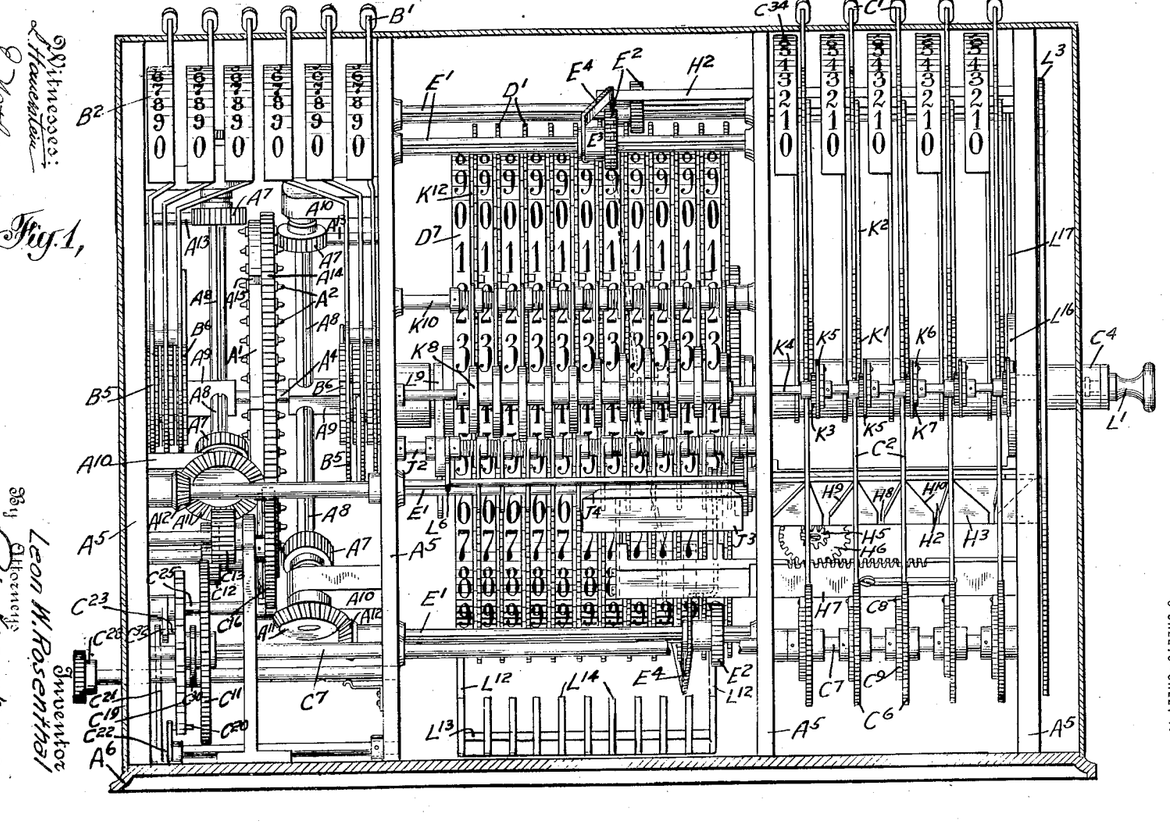
Figure 1 is a front elevation of the working parts of the machine.
Figure 2:
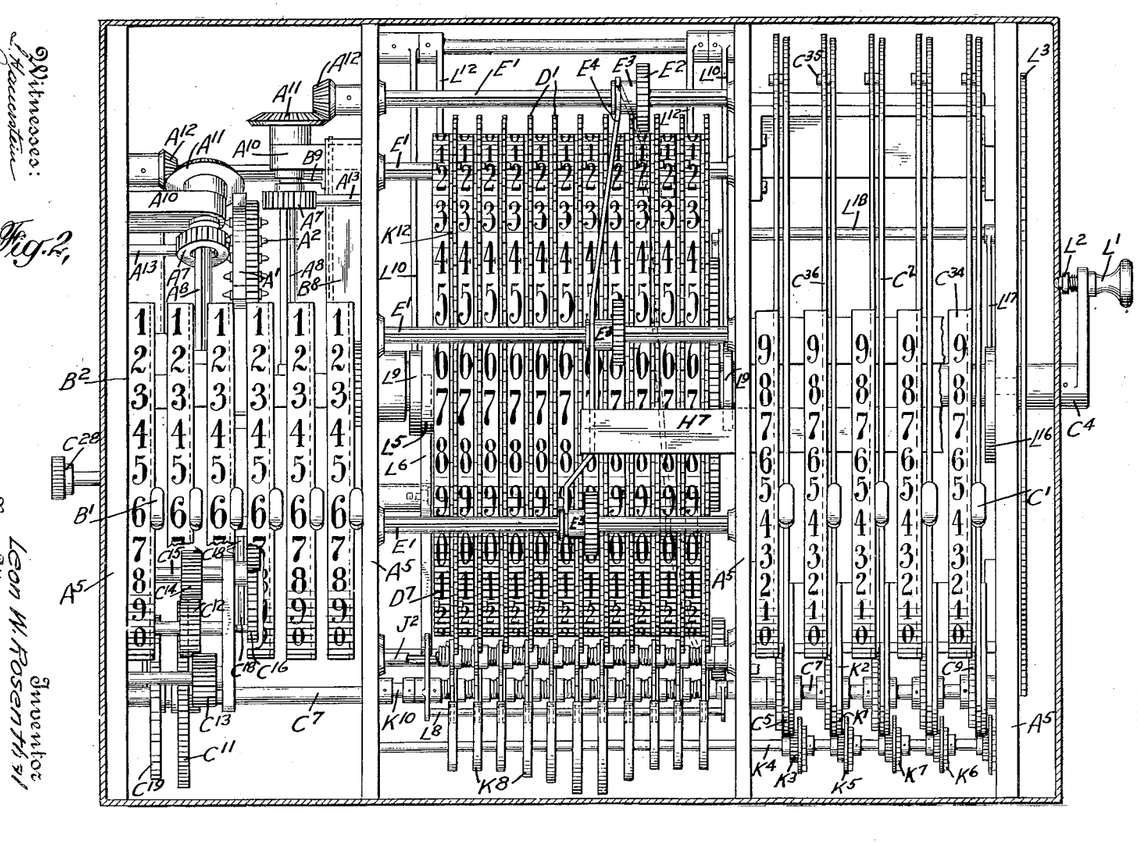
Fig. 2 is a plan view thereof.
Figure 3:
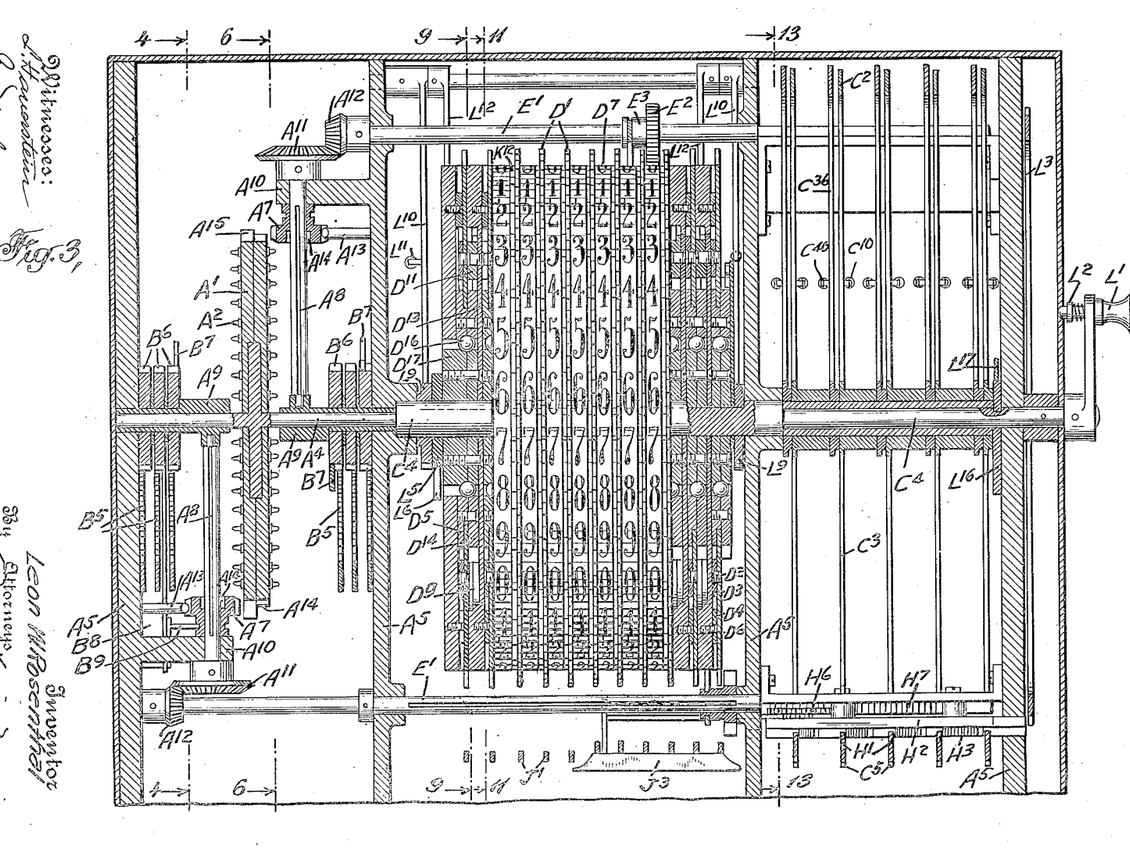
Fig. 3 is a section on line 3—3 of Fig. 9.
Figures 4, 5:
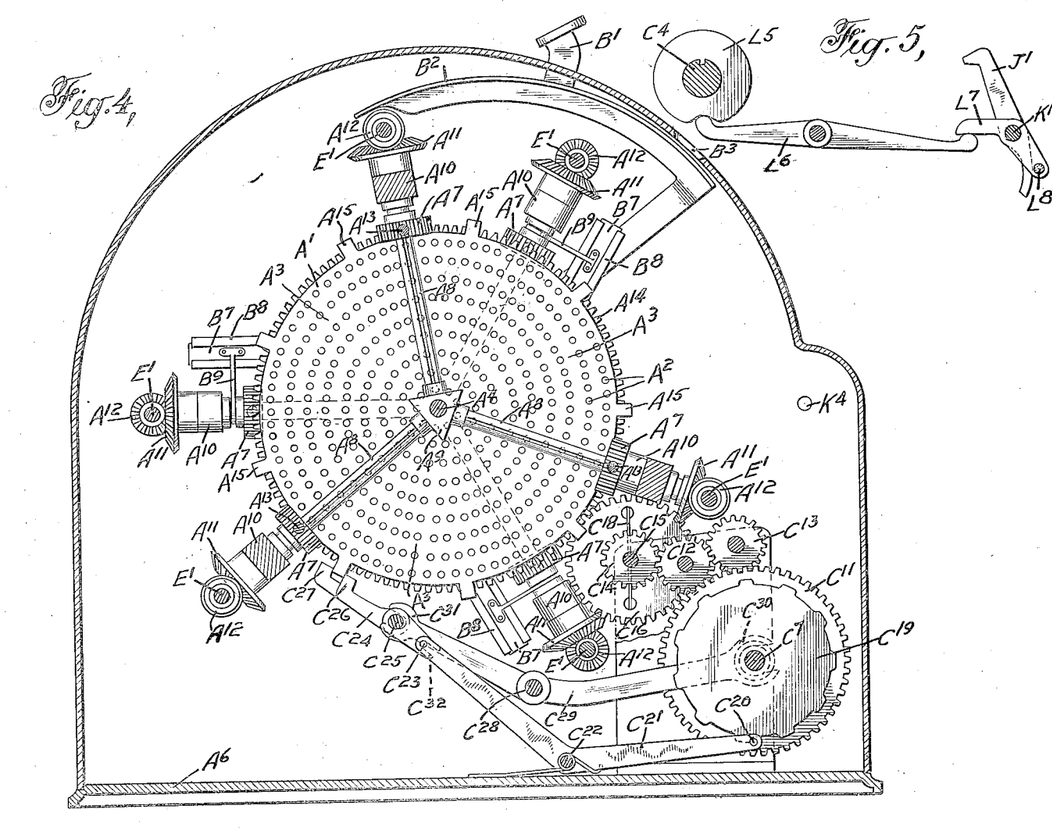
Figs. 4, 6, 9, 11 and 13 are sections on the corresponding section lines of Fig. 3.
Fig. 5 is a side elevation of a part of the clearing mechanism.
Figures 13, 14, 15:
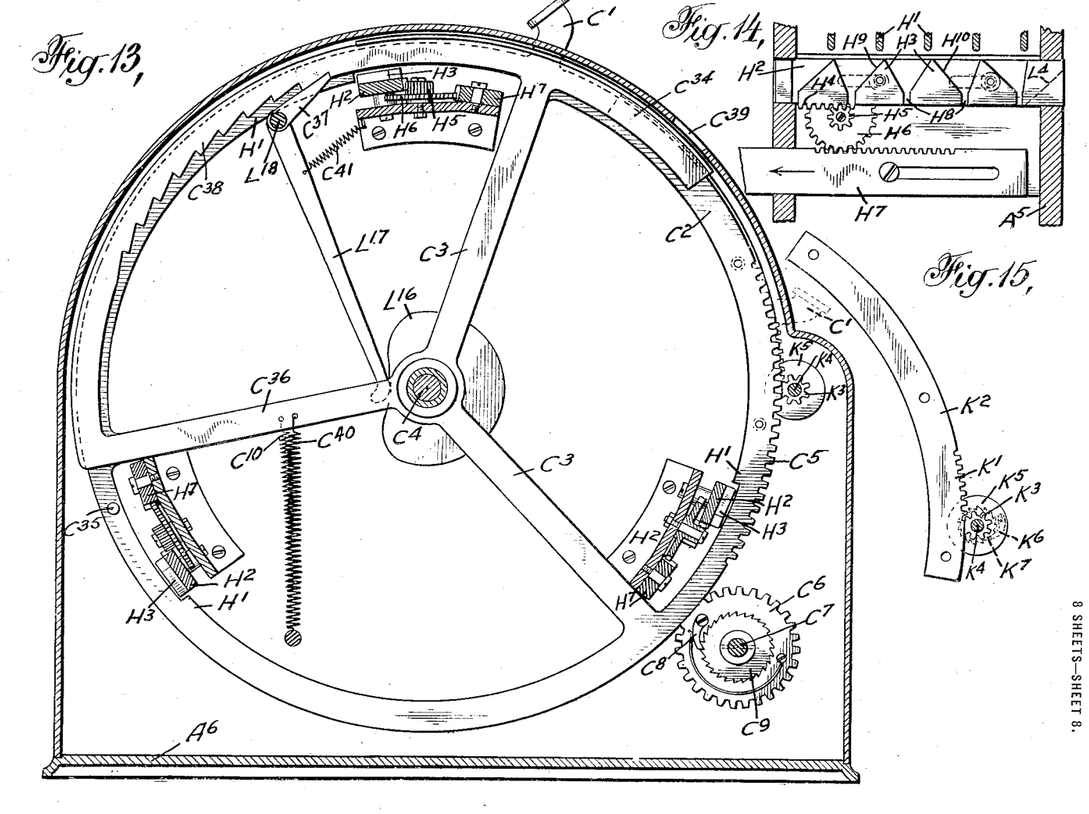
Fig. 14 is a view of a part of the denomination selecting mechanism.
Fig. 15 shows a part of the rectifier driving mechanism.

The multiplying mechanism, comprising the multiplying member $A'$ and the gears $A^7$, is driven by hand in setting up the multiplier digits. There are five operating levers for the five multiplier digits for which the machine is designed, and each comprises a handle $C'$ fastened to a rim $C^2$ which is provided with spokes $C^3$ extending to a hub loosely mounted on the shaft $C^4$. The toothed part $C^5$ of each rim $C^2$ is, in the normal position illustrated in Figs. 1 and 13, out of mesh with the mutilated gear $C^6$, the smooth peripheral part of the rim registering with the smooth peripheral part of the gear $C^6$ and holding the gear against movement. The mutilated gears $C^6$ are loose on the driving shaft $C^7$, and each carries a spring pressed pawl $C^8$ engaging a ratchet wheel $C^9$ pinned on that shaft. In the first part of the movement of a handle $C'$ from its normal position, the mutilated gear $C^6$ is not turned, for the purpose hereinafter explained, but afterward the toothed portion $C^5$ engages the teeth of that gear and turns the driving shaft $C^7$ through the pawl and ratchet wheel. The amount of rotation of the shaft depends upon the amount of depression of the handle $C'$ in accordance with the numerical value of the multiplier digit to be set up, and when the handle $C'$ is released at the end of the driving operation, the spring $C^{10}$, attached to a spoke $C^3$ and tensioned upon movement thereof, returns the handle to its normal position. In this return movement, the previously operated gear $C^6$ is turned back without turning the ratchet wheel $C^9$ on the driving shaft $C^7$, and is again held against movement when the smooth peripheral portions of the rim $C^2$ and gear $C^6$ register. While the driving shaft $C^7$ is being turned by a ratchet wheel $C^9$, upon depression of the corresponding handle $C'$, the other four ratchet wheels turn idly and their associated gears $C^6$ and rims $C^2$ remain locked against movement as a result of the engagement of their smooth peripheral portions. The gear $C^{11}$ is axially slidable in a keyway on the driving shaft $C^7$ from engagement with the gear $C^{12}$ into engagement with the gear $C^{13}$ which is meshed with the gear $C^{12}$ over a part of their face. (See Figs. 1, 2 and 4). The gear $C^{12}$ is also meshed with the gear $C^{14}$ which is fast on its shaft $C^{15}$. The gear $C^{16}$ is loose on the shaft $C^{15}$ but is connected thereto by the diametrically-disposed spring $C^{18}$ and meshed with the peripheral teeth $A^{14}$ of the multiplying disk $A'$. Thus, in one axial position of the gear $C^{11}$, the multiplying disk $A'$ is driven in one direction of rotation upon depression of any of the operating levers $C'$, for multiplication and addition, and in the other axial position of the gear $C^{11}$, the multiplying disk is then driven in the other direction of rotation, for division and subtraction. The gears $C^{11}$, $C^{12}$ and $C^{13}$ form reversing mechanism between the driving shaft $C^7$ and the multiplying disk $A'$, and also they provide such speed ratio that the full depression of the operating lever to the dotted position shown in Fig. 13 turns the multiplying disk one complete rotation, or through nine sectors of pins $A^2$, while any other amount of depression turns the multiplying disk through a number of sectors of pins equal to the value of the multiplier digit set up in any case. The spring $C^{18}$ provides a yielding connection between the driving shaft $C^7$ and the multiplying disk $A'$, which yielding connection together with the stopping mechanism provides a step-by-step driving mechanism designed to advance the multiplying disk $A'$ one sector at a time in such manner that the radial lines $A^3$ of teeth are in registry with the gears $A^7$ after the actuation of any operating lever $C'$ to set up any multiplier digit. The stopping mechanism then holds the multiplying disk in that position until the next actuation. (See Fig. 4). The notched disk $C^{19}$ is fast on the driving shaft $C^7$ and it coöperates with a pin $C^{20}$ carried at one end of a spring-pressed rocking-lever $C^{21}$ pivoted at $C^{22}$. The other end of the rocking-lever $C^{21}$ carries a long pin $C^{23}$ embraced by the forked arm $C^{32}$ which is fast on the shaft $C^{25}$. The double pawl $C^{24}$ is axially slidable on the shaft $C^{25}$ and coöperates with the nine abutments $A^{15}$ around the periphery of the multiplying disk $A'$. The fingers $C^{26}$ and $C^{27}$ of the double pawl lie side by side and their engaging surfaces are separated by the thickness of an abutment $A^{15}$. The front finger $C^{26}$ in Fig. 4 is for rotation of the multiplying disk in anti-clockwise direction, and the rear finger $C^{27}$ is for clockwise rotation, the reversing lever $C^{28}$ being fastened to a slidable arm $C^{29}$ which carries a fork $C^{30}$ engaged with the collar of the gear $C^{11}$, and which also carries a fork $C^{31}$ engaged with the collar forming the bearing of the double-pawl $C^{24}$. When the reversing lever $C^{28}$ is in the position shown in Fig. 1, the gear $C^{11}$ is engaged with the gear $C^{12}$, and the pawl finger $C^{27}$ coöperates with the abutments $A^{15}$, and in the other position of the reversing lever the gear $C^{11}$ is engaged with the gear $C^{13}$ and the other pawl finger $C^{26}$ coöperates with the abutments $A^{15}$. The pin $C^{20}$ lies in a notch of the notched disk $C^{19}$ whenever the machine is at rest, one of the pawl fingers $C^{26}$ or $C^{27}$ then engaging an abutment $A^{15}$ to hold the multiplying disk in fixed position. As soon as the driving shaft $C^7$ is turned by an operating lever $C'$, the spring $C^{18}$ is flexed until the multiplying disk $A'$ is released by the engaged pawl finger, which occurs as soon as the notched disk $C^{19}$ turns far enough with the driving shaft to raise the pin $C^{20}$ out of the notch it occupies. Shortly after the previously engaged abutment passes over the pawl finger $C^{26}$ or $C^{27}$ which held it, the pin $C^{20}$ drops into the next notch and the pawl finger drops into position to engage the next abutment $A^{15}$. If the operating lever $C'$ is depressed further, the spring $C^{18}$ is again flexed and the multiplying disk is allowed to turn through another sector of pins, and so on until the multiplier digit is set up. By means of the yielding gearing mechanism and the stopping mechanism therefor, the multiplying disk is given a step-by-step rotary movement of a sector of pins at a time and the multiplying disk is forced to exact position after each impulse, the radial lines $A^3$ of pins registering each time with all the gears $A^7$. Any multiplicand factor of six or less digits is set up by the setting levers $B'$ which positively move the respective gears $A^7$ to the circular series of pins $A^2$ containing in each sector a number thereof equal to the digit represented. The operating handles $C'$ are then moved in any order to set up the multiplier factor, the multiplying disk $A'$ being turned each time through a number of sectors equal to the numerical value of the multiplier digit. In this way, each gear $A^7$ is turned each time through a number of teeth equal to the product of the multiplicand digit it represents and the multiplier digit set up at that time. As soon as each operating handle $C'$ is released, its spring $C^{10}$ pulls it back to normal position. (See Fig. 13). However, the multiplier indicator $C^{34}$, which is moved around by reason of the engagement of the pin $C^{35}$ on the rim $C^2$ with the spoke $C^{36}$ of the indicator, is held by the pawl $C^{37}$ and ratchet teeth $C^{38}$ in the farthest position to which it is turned. Thus, the multiplier digits set up show on the multiplier indicators $C^{34}$ through the apertures $C^{39}$, the pin $C^{35}$ being normally away from the spoke $C^{36}$ to allow for the depression of the handle $C'$ prior to the driving operation of the shaft $C^7$. Each multiplier indicator $C^{34}$ is mounted loosely on the shaft $C^4$ and closely alongside of the rim $C^2$ operating it. The springs $C^{40}$ pull the individual indicators back to zero when the machine is cleared at the end of the calculation, the springs $C^{41}$ holding the individual pawls $C^{37}$ engaged with the ratchet teeth $C^{38}$ until released at that time, as will appear hereinafter.

The adding mechanism on which the partial results are registered by the multiplying mechanism embodies individual differential gearings for the eleven indicators. (Figs. 3, 9, 10, 11 and 12.) The differential gearings are alike except that the one of lowest denomination has its transfer receiving component locked against rotation as shown on the extreme right of Fig. 12, and the one of highest denomination has no transfer actuating component. The driving component $D'$ has external teeth of large pitch. It carries two studs $D^2$ on which are loosely mounted the gears $D^3$ meshed with the internal teeth of the indicating component $D^4$, and also meshed with the gear $D^5$. The indicating component is screwed at $D^6$ to the dial $D^7$ and is provided with star teeth $K^{12}$ forming part of the rectifying mechanism, as will appear hereinafter. Each dial has three series of digits 0 to 9, and for each series there are two teeth $D^8$ projecting inwardly alongside of a smooth ring $D^9$ having a cut out portion registering with the groove between the two teeth. A gear $D^{11}$ is loosely mounted on a stud $D^{12}$ carried by the disk $D^{13}$, the gear having six teeth in the path of the two teeth $D^8$ and meshed with the gear $D^{14}$, and also having three teeth sliding in smooth contact with the smooth ring $D^9$. The transfer receiving component is made up of the two gears $D^5$ and $D^{14}$ fastened together by screws $D^{15}$ and forming between them a bearing on which the driving component $D'$ may turn loosely independently of the transfer receiving component. The gear $D^5$ extends into the differential gearing of the next higher denomination and meshes with the two gears $D^3$. The transfer receiving component is mounted on the balls $D^{16}$ which rest on the complementary races $D^{17}$ screwed to the disk $D^{13}$. The ball races $D^{17}$ and the disks $D^{13}$ are keyed to the normally stationary shaft $C^4$. When a driving component $D'$ is turned, the corresponding dial $D^7$ is turned through a number of figures equal to the number of teeth $A^2$ of the multiplying disk $A'$ which pass the gear $A^7$ connected to the driving component at the time. When any dial is passing from 9 to 0 in multiplication or addition, and from 0 to 9 in division or subtraction, a unit is added to or subtracted from the dial of next higher denomination by reason of the fact that the two teeth $D^8$ then turn the gears $D^{11}$ and the transfer receiving component $D^{14}$, $D^5$, thus advancing the gear $D^3$ and also the indicating component $D^4$ two teeth so that the dial $D^7$ of next higher denomination is advanced one figure in the direction that is being driven by the driving component, whether or not the driving component of that gearing is being actuated when the carry occurs. The balls $D^{16}$ reduce the turning resistance of the transfer receiving component so that two or more simultaneous carries may occur without binding in the adding mechanism.

The transmitting connections extend from the multiplying mechanism to the adding mechanism and transmit the rotation of the gears $A^7$ to the gears $D'$. (Figs. 1, 2, 3, 9 and 11.) The bevel gears $A^{12}$ are fast on the shaft $E'$ journaled in the side plates $A^5$. These shafts are circularly disposed and extend straight across the machine from the shafts $A^8$ to the adding mechanism. Each shaft is grooved and carries a single connecting gear $E^2$ with a pin extending into the groove so as to be slidable along the shaft and rotatively connected thereto at all axial positions. Each gear $E^2$ has a grooved collar $E^3$ so that the clutch ring $E^4$ is adapted by engagement with the collars to axially shift the series of six gears axially as a unit although each gear is capable of independent rotation. The gears $E^2$ are axially offset by the distance between adjacent gears $D'$, the gear $E^2$ at the extreme left of the series being driven by that gear $A^7$ which is set up by the setting lever $B'$ on the extreme left in Fig. 2, and the second gear $E^2$ from the extreme left being driven by the gear $A^7$ set up by the second setting lever $B'$ from the extreme left, and so on to the gear $E^2$ on the extreme right which is driven by the gear $A^7$ set up by the setting lever $B'$ on the extreme right. Thus the clutch ring $E^4$ connected to these gears extends around a helix.

The denomination selecting mechanism for connecting the multiplying mechanism to the different series of denominations of the adding mechanism corresponding to the denominations of the multiplier digits, will now be described. (Figs. 1, 3, 13 and 14). Each of the five operating levers $C'$ carries three ring sections $H'$ each of which, immediately upon movement from the normal position illustrated in the drawings, is arranged to shift a longitudinally slidable clutch plate $H^2$ to a definite position by engagement with a V-shaped raised portion $H^3$, the clutch plates being completely shifted during the first part of the movement of any operating lever $C'$ prior to the driving operation of the shaft $C^7$. Each clutch plate has teeth $H^4$ meshed with a pinion $H^5$. The gear $H^6$ is fast with the pinion $H^5$ and is meshed with a longitudinally slidable rack $H^7$, the whole forming a multiplication gearing of such ratio that movement of the clutch plate $H^2$ produces about three times the axial displacement of the set of gears $E^2$, the three racks $H^7$ being fastened to the clutch ring $E^4$ at angularly separated places to move it without bending or binding in movements of substantial parallel translation. There are five V-shaped portions $H^3$ having different side inclinations, the total lead on both sides, that is, the distance between the slots $H^8$, being alike and being greater than the axial distance between adjacent ring sections $H'$ by an amount proportional to the distance between successive axial positions of the gears $E^2$. The operating lever $C'$ on the extreme left in Fig. 1 shifts the six gears $E^2$ from any position they may have had previously to the position at which they are meshed with the series of gears $D'$ comprising the second to seventh from the extreme left and corresponding to multiplier denomination of ten-thousands; the second operating lever C' from the extreme left moves the six gears $E^2$ into mesh with the series of gears D' comprising the third to eighth from the extreme left and corresponding to the multiplier denomination of thousands; and so on to the operating lever C' on the extreme right, which meshes the six gears $E^2$ with the series of six gears D' on the extreme right, corresponding to the multiplier denomination of unity. It will be observed that the series of gears $E^2$ are moved positively as a unit in one direction of the other, depending upon their previous position, the forward end of the ring sections H' bearing on the left hand inclines $H^9$ of the clutch plate $H^2$ in shifting the series of gears $E^2$ from a lower to a higher series of denominations of the adding mechanism, and bearing on the right hand inclines $H^{10}$ in shifting the gears into mesh with a lower series. It will also be observed that just after the clutch plate has been completely shifted, the ring section H' enter its slot $H^8$ and holds the gears $E^2$ against disengagement until the depressed operating lever C' is returned by the spring $C^{10}$ to its normal position after being released by the operator. By these means no two or more of the operating levers can be depressed simultaneously, and furthermore no operating lever can be depressed until the one depressed has been returned, that is, until the multiplying member A' and the parts driven thereby are at rest after the multiplier digit has been set up.

It is necessary to lock against rotation all of the gears D' of higher denomination than the highest engaged at the time by the gears $E^2$, in order that the carries thereto will be transferred. (Figs. 1, 2, 9 and 11). For this purpose a pawl J' loosely journaled on the rod $J^2$ is provided for each gear D' and all the pawls are normally spring-pressed into locking engagement therewith. In order to unlock the series of gears D' meshed with the gears $E^2$, the unlocking bar $J^3$ carried by one of the racks $H^7$ is provided, this bar having beveled ends $J^4$ designed to engage the tail of each pawl as it passes by, and also having a central part designed to hold out the six pawls corresponding to the six gears D' engaged at this time by the series of gears $E^2$. The arrangement is such that as soon as the unlocking bar $J^3$ moves one way or the other with the denomination selecting mechanism, the pawl just disengaged thereby immediately springs back into locking position, whereby all the gears D' which are disengaged by the gears $E^2$ are held against rotation and in definite position for reëngagement.

Figures 9, 10:
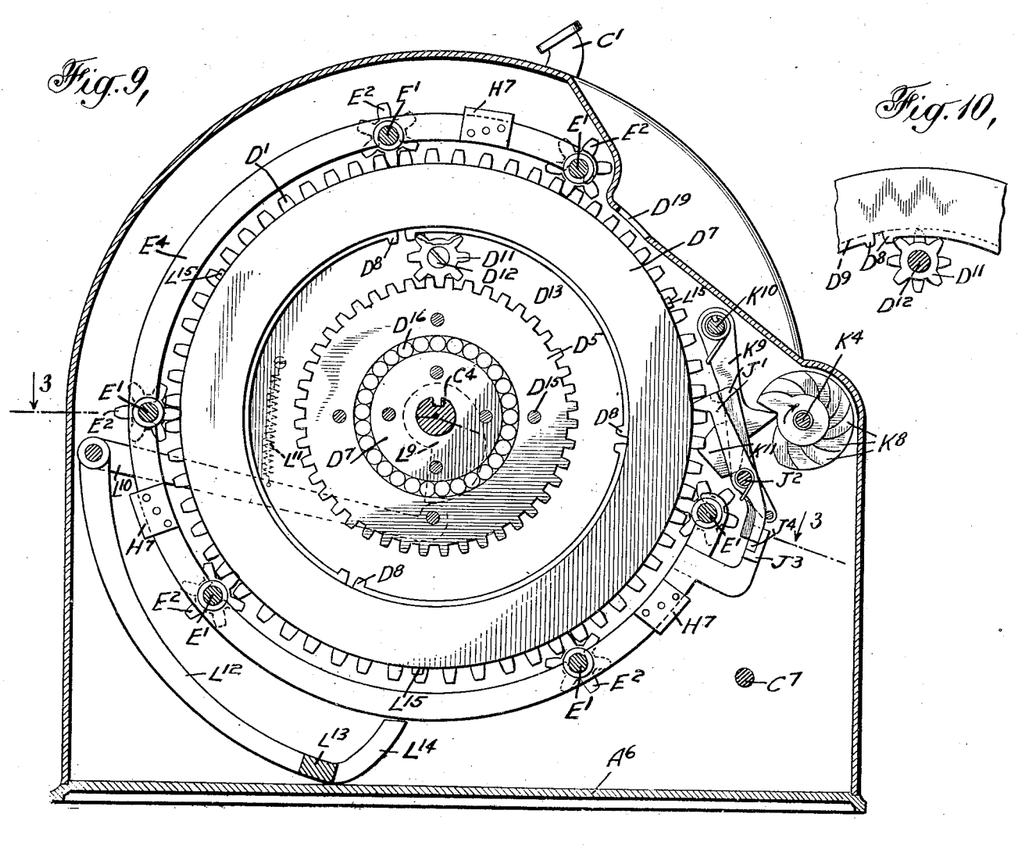
Fig. 10 is a side elevation of a part of the transfer mechanism.
Figures 11, 12:
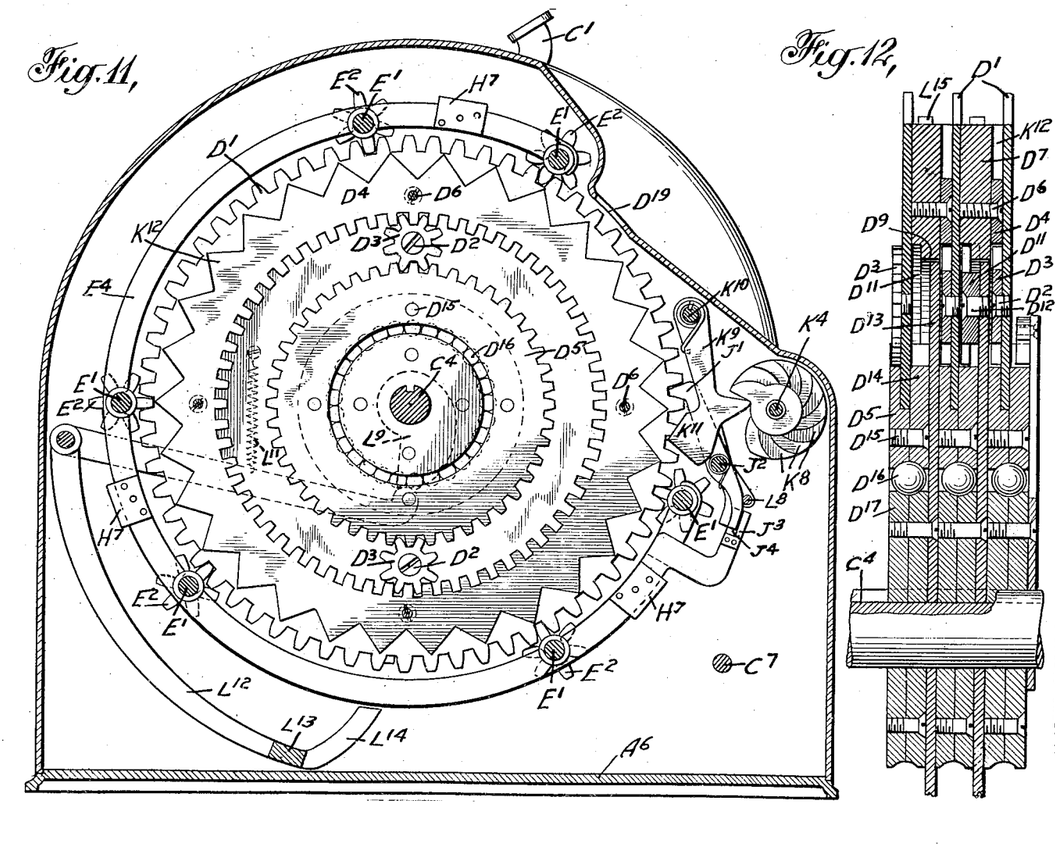
Fig. 12 is a section, on an enlarged scale, of a part of the adding mechanism.

The rectifying mechanism operates on the dials of the adding mechanism in the order of ascending denomination and during the return stroke of any operating lever. In this way the back lash between the dials is taken up directly after the registration of each partial result, completing the carries and bringing the figures of the result to a straight reading line throughout, notwithstanding the looseness that is purposely introduced between the gears to ease the operation of the adding and multiplying mechanisms. (Figs. 1, 2, 9, 11, 13 and 15). Alongside of each rim $C^2$, and fastened thereto, is a segment having a toothed part K' and smooth peripheral parts $K^2$. The smooth peripheral parts of the intermittent gears $K^3$ and the corresponding segment are normally in registry so that the gears are then prevented from turning. All of the gears $K^3$ are loose on the shaft $K^4$ and each is fast with a disk $K^5$ which carries a spring-pressed pawl $K^6$ engaged with a ratchet wheel $K^7$ fast on the shaft, the arrangement being such that when a segment is depressed upon depressing an operating lever C' to set up a multiplier digit, the corresponding gear $K^3$ and pawl $K^6$ turn loosely on the shaft $K^4$ when the toothed part of the segment K' passes in engagement with the gear $K^3$, while the other gears and pawls then remain still. Upon movement of the segmen in the reverse direction after releasing the operating lever C', the shaft $K^4$ turns with the corresponding gear and the other ratchets turn idly past their pawls. The gears $K^3$ are of such size and the toothed part K' is of such extent that each gear $K^3$ is turned from the beginning of depression of the operating lever C' from its normal position until the time that the shaft $C^7$ starts to turn, whereupon the smooth peripheral parts again register. The gear $K^3$ again makes one complete rotation during this part of the return movement. Thus the shaft $K^4$ is given one complete rotation in a clockwise direction as seen in Fig. 9 after the registration of each partial result irrespective of the value of the multiplier digit that was set up in multiplication or division. The shaft $K^4$ carries eleven axially spaced cams $K^8$, each having a gradual incline angularly offset relatively to the others and a steep incline in line with the similar part of the other cams, the circumferential portion decreasing in extent toward the highest denomination of the adding mechanism. Coacting with each cam $K^8$ is an outwardly spring-pressed hammer $K^9$ loosely journaled on the rod $K^{10}$ and having a beveled rectifying portion $K^{11}$ adapted to fit snugly between the points of the star teeth $K^{12}$, so that upon depression of a hammer to its innermost position, the star teeth and the dial $D^7$ to which it is fastened are forced to exact position. In this way, the dials are spotted successively in the order of ascending denomination, the back lash in the adding mechanism being taken up and the carries between the denominations being completed progressively. At the end of the operation, the result appears in a straight reading line from end to end irrespective of the previous direction of rotation of the dials, and the adding mechanism is ready for the registration of another partial result. It will be observed that a dial is completely rectified when its hammer $K^9$ is fully depressed, that is, when the circumferential part of the corresponding cam engages the tail of the hammer. The inclines have similar slopes, and the starting points thereof are so arranged that at the moment that one hammer is fully depressed, the one of next higher denomination is depressed about half way, and the one of second higher denomination has just started in its movement of depression. Furthermore, all the dials are locked by their hammer in rectified position until the end of the operation, whereupon all the hammers are allowed to be spring-returned outward to normally clear position by reason of the fact that the declines of all the cams $K^8$ then register simultaneously with the hammers.

Figures 6, 7, 8:
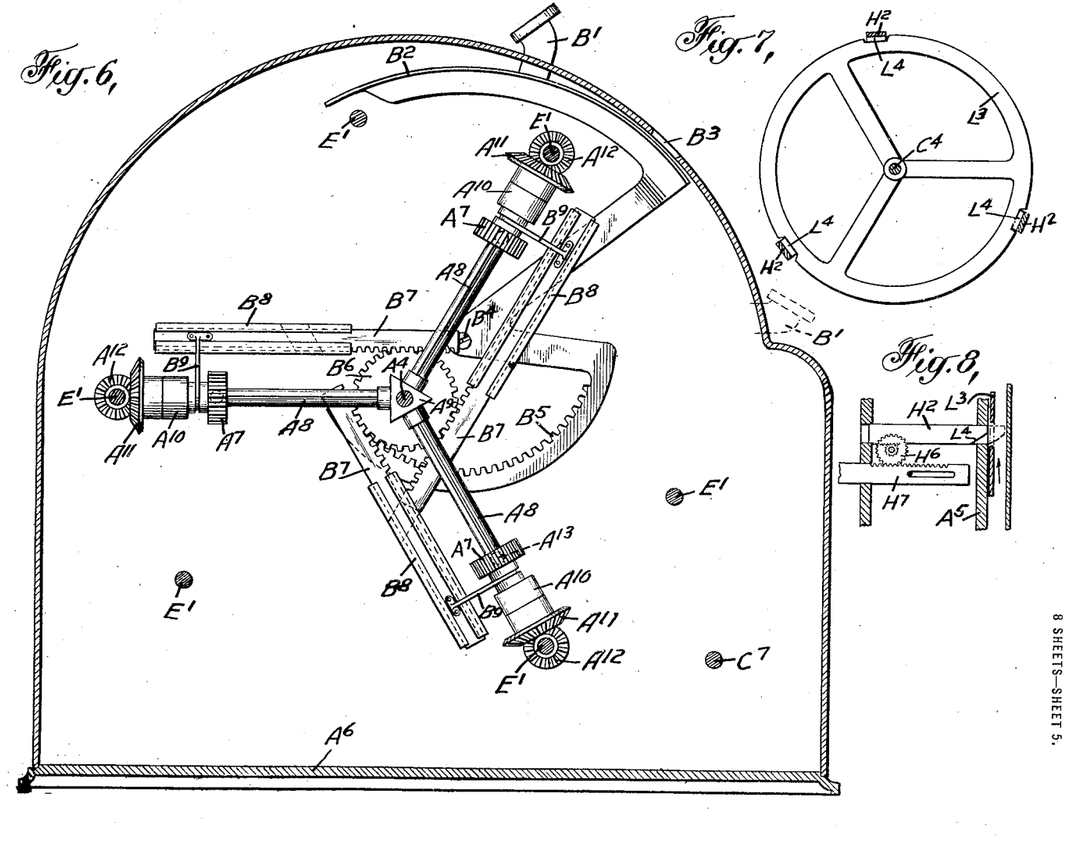
Figs. 7 and 8 are detail views of other parts of the clearing mechanism, drawn to a reduced scale.

Clearing mechanism is provided for resetting the dials $D^7$ and the multiplier indicators $C^{34}$ to O, and this is done by turning the clearing handle $L'$, the gears $E^2$ and the pawls $J'$ being preliminarily disengaged from the gears $D'$ to unlock the differential gearings of the adding mechanism. The clearing handle $L'$ is fast on the shaft $C^4$ and it carries a spring finger $L^2$ fitting in a hole in the casing when the handle is in normal position. The ring $L^3$ is fast on the shaft $C^4$ and it is shaped to engage the inclines $L^4$ on the bottom of the right hand end of the clutch plates $H^2$ and thereby force the gears $E^2$ to places between adjacent gears $D'$, as soon as the clearing handle $L'$ is turned slightly from its normal position (Figs. 7 and 8). Likewise the cam $L^5$ is fast on the shaft $C^4$ and has a small depression in which the inner ends of pivoted lever $L^6$ normally rests, so that when the shaft is turned only slightly from its normal position, this lever actuates the bell cranks $L^7$ and the cross rod $L^8$ fastened thereto, disengaging all the engaged pawls $J'$ from the gears $D'$. (Fig. 5). The arrangement is such, that the pawls are held in a disengaged position until the clearing handle $L'$ again reaches its normal position, whereupon the pivoted lever $L^6$ is forced back into the depression of the cam $L^5$ when the spring-pressed pawls $J'$ again engage the gears $D'$.

While the clearing handle $L'$ is being turned, the shaft $C^4$ and all the disks $D^{13}$ carrying the six-tooth three-tooth gears $D^{11}$ are turned around the axis of the shaft. As the six-tooth portion of each gear $D^{11}$ engages the two teeth $D^8$, the dial $D^7$ fastened thereto is carried around with the shaft $C^4$. In the meantime, the high points of the cams $L^9$, which are fastened to the shaft $C^4$, move out of contact with the inner ends of the levers $L^{10}$, thus allowing the springs $L^{11}$ to pull up the levers $L^{12}$, and raise the cross bar $L^{13}$ until all the arms $L^{14}$ carried thereby are brought into the path of the abutments $L^{15}$ on the dials $D^7$. Thus, as the dials are turned as aforesaid, one of three abutments $L^{15}$ on each dial strikes its lever $L^{14}$ and is held in this position in which a zero on the dial appears in the window $D^{19}$.
When the clearing handle $L'$ is returned to its normal position, the six-tooth three-tooth gears $D^{11}$ have their proper location for carrying, and the levers $L^{10}$ are returned by the springs $L^{11}$ to the position wherein the arms $L^{14}$ clear the abutments $L^{15}$. Furthermore while turning the clearing handle $L'$, the pawls $C^{37}$ are turned by the cam $L^{16}$ out of engagement with the ratchet teeth $C^{38}$ of the multiplier indicators $C^{34}$, allowing the springs $C^{40}$ to pull the indicators back to their normal position wherein O shows through the windows $C^{39}$. (Figs. 1, 2, 3 and 13). For this purpose all of the pawls $C^{37}$ and also the arm $L^{17}$ are fast on the shaft $L^{18}$, so that when the handle $L'$ is turned from its normal position, all the multiplier indicators $C^{34}$ are simultaneously released, and when the handle is returned at the end of the clearing operation, all the pawls $C^{37}$ are retracted into latching position by the springs $C^{41}$.

Having thus described my invention, what I claim is:

1. In a calculating machine, a double-face 
rotatable multiplying disk having a plurality of oppositely-disposed projections extending axially outward on the two sides of the disk and forming circular series arranged in sectors contiguous to each other along substantially radial lines, a supporting shaft extending outwardly on both sides of the disk and being fastened thereto, gears arranged on both faces of the disk and movable along said radial lines into engagement with any one of said series, and an adding mechanism on which the actuation of the gears by the projections is registered.

2. In a calculating machine, a rotatable multiplying member having series of engaging points, a gear engageable with the engaging points, a setting lever movable about the axis of rotation of the multiplying member, connections between the lever and gear, and an adding mechanism on which the actuation of the gear by the engaging points is registered.

3. In a calculating machine, a rotatable multiplying disk having circular series of engaging points on its face, a rotatable shaft extending across said series, a gear rotatively connected to said shaft, a setting lever movable about the axis of rotation of the disk, positively-connected gearing between the lever and gear for positively moving the gear along said shaft from one to another of said series, and an adding mechanism on which the actuation of the gear by the engaging points is registered.

4. In a calculating machine, a rotatable multiplying disk having circular series of engaging points on its face, a plurality of rotatable shafts extending in different directions across said series, gears rotatively connected with individual shafts and slidable therealong, setting levers movable about the axis of rotation of the disk, gearing designed to move the respective gears toward the center of the disk from one to another of said series when the levers are depressed, and an adding mechanism on which the actuation of the gears by the engaging points is registered.

5. In a calculating machine, a multiplying disk having circular series of engaging points, a shaft extending across said series, a gear slidably mounted on said shaft, a rack arranged to slide the gear along the shaft from one to another of said series and having a manually-operable handle for positioning it, a setting segment, a gear meshed in different axial planes with the rack and the segment, and an adding mechanism on which the actuation of the gear by the engaging points is registered.

6. In a calculating machine, a rotatable multiplying disk having circular series of engaging points, a shaft extending across said series, a gear slidably mounted on said shaft, a rack arranged to slide the gear along the shaft from one to another of said series, a circular setting segment movable about the axis of rotation of the disk, a gear meshed with the rack and segment, and an adding mechanism on which the actuation of the gear by the engaging points is registered.

7. In a calculating machine, a double-face rotatable multiplying disk having engaging points arranged in circular series on both faces, rotatable shafts on both sides of the disk extending across said series, gears rotatively connected to individual shafts and slidable therealong from one to another of said series, adding dials on which the actuation of the gears by the engaging points is registered, rotatable transmitting connections coöperative with the dials, and gearing effecting the same direction of rotation of the dials by the gears on both sides of the disk and comprising gears on the shafts on one side of the disk meshed with gears on the transmitting connections, and gears on the shafts on the other side of the disk reversely meshed with gears on others of the transmitting connections.

8. In a calculating machine, a rotatable multiplying member, shaft-mounted gears actuated thereby, an adding mechanism on which the actuation of said gears is registered, and transmitting connections including a plurality of circularly-disposed shafts parallel throughout from the adding mechanism to the shafts mounting the gears actuated by the multiplying member.

9. In a calculating machine, a rotatable multiplying disk, a plurality of radially-disposed shafts, gears on said shafts actuated by the multiplying disk, an adding mechanism on which the actuation of the gears is registered a plurality of circularly-disposed parallel shafts, gears on the circularly-disposed shafts in mesh with gears on the radially-disposed shafts and other gears on the circularly-disposed shafts coöperative with the adding mechanism.

10. In a calculating machine, a multiplying mechanism, an adding mechanism, transmitting connections including a plurality of gears each of which is driven by a different denomination of the multiplying mechanism, and denomination selecting mechanism designed to connect said gears to different series of denominations of the adding mechanism corresponding to the denomination of the multiplier digit.

11. In a calculating machine, a multiplying mechanism, an adding mechanism, shafts driven by the individual denominations of the multiplying mechanism, gears driven by the individual shafts, and denomination selecting mechanism designed to connect the gears to the series of denominations of the adding mechanism corresponding to the denomination of the multiplier digit.

12. In a calculating machine, a multiplying mechanism, an adding mechanism, transmitting connections including a single series of gears connected to the individual denominations of the multiplying mechanism, and denomnation selecting mechanism designed to move the series of gears into engagement with the series of denominations of the adding mechanism corresponding to the denomination of the multiplier digit.

13. In a calculating machine, a multiplying mechanism an adding mechanism, transmitting connections including a single series of gears connected to the individual denominations of the multiplying mechanism, a clutch member coöperative with the series of gears to connect them to different series of denominations of the adding mechanism, and means coöperative with the clutch member to position it in accordance with the denomination of the multiplier digit.

14. In a calculating machine, a multiplying mechanism, an adding mechanism, circularly-disposed shafts driven by the multiplying mechanism, a single series of axially-offset gears mounted on individual shafts, a clutch ring connected to said gears, and means coöperative with the clutch ring to connect the gears to the adding mechanism.

15. In a calculating machine, a multiplying mechanism, an adding mechanism, circularly-disposed shafts driven by the multiplying mechanism, gears mounted on individual shafts and axially offset around a helix, a clutch ring having yokes for the individual gears to move them axially, and means coöperative with the clutch ring to move the gears into engagement with the adding mechanism.

16. In a calculating machine, a multiplying mechanism, an adding mechanism, a series of circularly-disposed transmitting connections driven by the multiplying mechanism, a clutch ring designed to connect the series of transmitting connections to different series of denominations of the adding mechanism, and shifting mechanism connected to the clutch ring at a plurality of angularly separated places to shift the clutch ring in movements of substantial parallel translation.

17. In a calculating machine, a multiplying mechanism, an adding mechanism, a series of transmitting connections driven by the multiplying mechanism, a clutch member designed to connect the series of transmitting connections to different series of denominations of the adding mechanism, and shifting mechanism connected to the clutch member by speed raising gearing.

18. In a calculating machine, a multiplying mechanism, an adding mechanism coöperative therewith, denomination selecting mechanism, and for each denomination of the multiplier factor a manually operated driving lever which first actuates the denomination selecting mechanism to connect the multiplying mechanism to the series of denominations of the adding mechanism that corresponds to the denomination of the multiplier digit and then drives the multiplying mechanism in accordance with the numerical value of the multiplier digit.

19. In a calculating machine, a multiplying mechanism, an adding mechanism, transmitting connections connected to the multiplying mechanism and including a single series of gears, and for each digit of the multiplier factor a driving lever which first connects the series of gears to the series of denominations of the adding mechanism that corresponds to the denomination of the multiplier digit and then drives the multiplying mechanism in accordance with the numerical value of the multiplier digit.

20. In a calculating machine, a multiplying mechanism, an adding mechanism, transmitting connections connected to the multiplying mechanism and including a single series of gears and driving mechanism which first connects the series of gears to the series of denominations of the adding mechanism that corresponds to the denomination of the multiplier digit and then drives the multiplying mechanism in accordance with the numerical value of the multiplier digit.

21. In a calculating machine a multiplying mechanism, an adding mechanism coöperative therewith, denomination selecting mechanism, and driving mechanism which upon moving from normal position first actuates the denominations selecting mechanism to connect the multiplying mechanism to the series of denominations of the adding mechanism that corresponds to the denominations of the multiplier digit and then drives the multiplying mechanism in accordance with the numerical value of the multiplier digit, said driving mechanism holding the denomination selecting mechanism locked in set position throughout the driving operation and unlocking it when normal position is again reached.

22. In a calculating machine, a multiplying mechanism, an adding mechanism coöperative therewith, denomination selecting mechanism, and for each denomination of the multiplier factor a driving lever which upon moving from normal position first actuates the denomination selecting mechanism to connect the multiplying mechanism to the series of denominations of the adding mechanism that corresponds to the denomination of the multiplier digit and then drives the multiplying mechanism in accordance with the numerical value of the multiplier digit, each driving lever being designed to hold the denomination selecting mechanism locked in set position throughout the driving position and when normal position is again reached to unlock it for operation by another lever.

23. In a calculating machine, a multiplying mechanism, an adding mechanism, denomination selecting mechanism for connecting the multiplying mechanism with different series of denominations of the adding mechanism, driving mechanism embodying for each denomination of the multiplier factor a set up lever which actuates the denomination selecting mechanism prior to the driving operation and which locks the denomination selecting mechanism in its set position during the driving operation, and automatic means returning the lever to normal position after the driving operation to thereby permit the operation of another lever.

24. In a calculating machine, a multiplying mechanism, an adding mechanism, denomination selecting mechanism, and for each denomination of the multiplier factor a spring-returned manually-operated driving lever coöperative with the denomination selecting mechanism to connect the multiplying mechanism to the series of denomination of the adding mechanism that corresponds to the denomination of the multiplier digit, each of said levers being designed to drive the multiplying mechanism in accordance with the numerical value of the multiplier digit and to hold the denomination selecting mechanism in locked position until spring-returned to its normal position after the driving operation.

25. In a calculating machine, a multiplying mechanism, an adding mechanism, transmitting connections connected to the multiplying mechanism and including a single series of connecting gears, denomination selecting mechanism having a cam for each denomination of the multiplier factor, and for each denomination of the multiplier factor a lever coöperative with the cam of its denomination to shift the series of gears into connection with the series of denominations of the adding mechanism that corresponds to the denomination of the multiplier digit.

26. In a calculating machine, a multiplying mechanism, an adding mechanism, transmitting connections connected to the multiplying mechanism and including a single series of connecting gears, denomination selecting mechanism having a V-shaped cam for each denomination of the multiplier factor, and for each denomination of the multiplier factor a lever coöperative with the cam of its denomination to shift the series of gears into connection with the series of denominations of the adding mechanism that corresponds to the denomination of the multiplier digit, the total lead of each of said cams being different than the distance between adjacent levers by an amount proportional to the distance between successive positions of the series of gears.

27. In a calculating machine, a multiplying mechanism, an adding mechanism coöperative therewith, and driving mechanism comprising for each denomination of the multiplier factor a manually-operated multiplier set-up lever, and gearing including a pawl and ratchet arranged to drive the multiplying mechanism in one direction of operation of the lever and also arranged for the return of the lever to normal position without actuating the multiplying mechanism.

28. In a calculating machine, a multiplying mechanism, an adding mechanism coöperative therewith, a driving mechanism comprising a driving shaft connected to the multiplying mechanism, and for each denomination of the multiplier factor a multiplier set-up lever connected to the driving shaft by pawl and ratchet mechanism arranged to drive the shaft without disturbing the other levers when any lever is moved from normal position and also arranged for the return of any lever to normal position without driving the shaft or disturbing the other levers.

29. In a calculating machine, a multiplying mechanism, an adding mechanism, denomination selecting mechanism for connecting the multiplying mechanism to different series of denominations of the adding mechanism, driving mechanism for the multiplying mechanism embodying intermittent gearing, and means for actuating the denomination selecting mechanism prior to the driving period of the intermittent gearing.

30. In a calculating machine, a multiplying member, an adding mechanism actuated thereby, and step-by-step driving mechanism embodying yielding gearing and a stopping device which first engages the multiplying member to stop it in definite position and is then disengaged therefrom by actuation of the gearing during the yielding period thereof to permit the operation of the multiplying member to its next position.

31. In a calculating machine, a multiplying mechanism, an adding mechanism actuated thereby, a driving shaft, a plurality of multiplier set-up levers individually operative on the driving shaft, and step-by-step gearing between the driving shaft and the multiplying mechanism.

32. In a calculating machine, a multiplying member having a plurality of stopping abutments, an adding mechanism actuated by the multiplier member, a driving shaft, operating mechanism for driving the shaft in accordance with the value of a multiplier digit, and step-by-step mechanism comprising a cam positively connected to the shaft, yielding gearing between the shaft and the multiplying member and a pivoted pawl coöperative with the cam and the stopping abutments, said pawl being rocked one way to clear the engaged abutment and thereby permit actuation of the multiplying member by the gearing and then being rocked the other way to engage the next abutment to stop the multiplying member in its next position.

33. In a calculating machine, an actuating mechanism, a differential adding mechanism having for each denomination a driving component driven by the actuating mechanism, an indicating component, and a transfer receiving component comprising one part engaged with the indicating component of that denomination and a second part connected to the first and engaged with the indicating component of next lower denomination, said driving component being mounted loosely between the two parts of the transfer receiving component so as to be rotatable independently thereof.

34. In a calculating machine; an actuating mechanism; a differential adding mechanism having for each denomination a dial, a driving component geared to the dial and extending outside the periphery thereof, and a transfer receiving component mounted interiorly of the dial of that denomination and also of the one of next lower denomination; a rectifier star wheel fastened to the dial on one side thereof; and gears driven by the multiplying mechanism and axially slidable past the star wheels into engagement with the driving components.

35. In a calculating machine, an actuating mechanism, a differential adding mechanism coöperative therewith, and a rectifier mechanism comprising star wheels fastened to the dials of the adding mechanism, and pivoted positioning fingers rotatable into coöperation with the star wheels and operable successively in the ascending order of denomination.

36. In a calculating machine, an actuating mechanism, an adding mechanism coöperative therewith, a driving mechanism including operating levers, and a rectifier mechanism comprising positioning devices for the individual denominations of the adding mechanism, cams coöperative with the positioning devices in the ascending order of denomination, and driving gearing including pawl and ratchet mechanism arranged for positive operation of the cams in the return stroke of the operating levers.

37. In a calculating machine, an actuating mechanism, an adding mechanism coöperative therewith, a driving mechanism including an operating lever, means for rectifying the adding mechanism in the order of ascending denominations, and rectifier driving mechanism including a segment actuated by the operating lever, and intermittent pawl and ratchet mechanism coöperative with the segment and arranged for positive operation of the rectifier mechanism at the end of the return stroke of the operating lever.

38. In a calculating machine, an actuating mechanism, an adding mechanism coöperative therewith, a driving mechanism including a plurality of operating levers, means for rectifying the adding mechanism in the order of ascending denominations, and rectifier driving mechanism including for each operating lever a segment actuated thereby, and intermittent pawl and ratchet mechanism coöperative with the segment and arranged for positive operation of the rectifier mechanism at the end of the return stroke of the operating lever.

39. In a calculating machine, a multiplying mechanism, an adding mechanism, a series of gears driven by the multiplying mechanism, spring-pressed pawls normally engaged with individual denominations of the adding mechanism, denomination selecting mechanism designed to connect the series of gears with different series of denominations of the adding mechanisms, and pawl disengaging means connected to the denomination selecting mechanism and designed to disengage the pawls from the series of denominations of the adding mechanism that is engaged by the gears at the time.

40. In a calculating machine; a multiplying mechanism; an adding mechanism coöperative therewith; a driving mechanism including for each denomination of the multiplier factor an operating lever designed to drive the multiplying mechanism in one direction of operation and to freely return to normal position when released; for each operating lever a multiplier indicator, and disengageable connecting means connecting the two together in the driving operation; and means holding the indicator in set position after the operating lever is released.

41. In a calculating machine; a multiplying mechanism; an adding mechanism coöperative therewith; driving mechanism including for each denomination of the multiplier factor an operating lever which drives the multiplying mechanism when it moves in one direction and which is inoperative on the multiplying mechanism in its return movement; and multiplier indicators disengageably connected to the respective operating levers so as to move therewith to set position without returning therewith.

42. In a calculating machine; a multiplying mechanism; an adding mechanism coöperative therewith; driving mechanism including for each denomination of the multiplier factor an operating lever which drives the multiplying mechanism when it moves in one direction and which is inoperative on the multiplying mechanism in its return movement; multiplier indicators disengageably connected to the respective operating levers so as to move therewith to set position without returning therewith; and means for clearing the multiplier indicators.

In testimony whereof I affix my signature.

LEON W. ROSENTHAL.